United States Patent
Masuko (10) Patent No.: US 9,519,984 B2
(45) Date of Patent: Dec. 13, 2016

(54) IMAGE PROCESSING DEVICE, IMAGE PROCESSING METHOD, INFORMATION STORAGE MEDIUM, AND PROGRAM

(71) Applicant: Rakuten, Inc., Tokyo (JP)

(72) Inventor: Soh Masuko, Tokyo (JP)

(73) Assignee: RAKUTEN, INC., Tokyo (JP)

(*) Notice: Subject to any disclaimer, the term of this patent is extended or adjusted under 35 U.S.C. 154(b) by 104 days.

(21) Appl. No.: 14/439,662

(22) PCT Filed: Mar. 29, 2013

(86) PCT No.: PCT/JP2013/059768
§ 371 (c)(1),
(2) Date: Apr. 30, 2015

(87) PCT Pub. No.: WO2014/155745
PCT Pub. Date: Oct. 2, 2014

(65) Prior Publication Data
US 2016/0035116 A1    Feb. 4, 2016

(51) Int. Cl.
*G06K 9/00*    (2006.01)
*G06T 11/60*    (2006.01)
*G06K 9/62*    (2006.01)
*G06T 5/00*    (2006.01)
*G06T 7/00*    (2006.01)
*G06T 11/00*    (2006.01)

(52) U.S. Cl.
CPC ............. *G06T 11/60* (2013.01); *G06K 9/6215* (2013.01); *G06T 5/00* (2013.01); *G06T 7/004* (2013.01); *G06T 11/001* (2013.01); *G06T 2207/20021* (2013.01)

(58) Field of Classification Search
CPC ...... G06K 9/6215; G06T 11/001; G06T 11/60; G06T 2207/20021; G06T 5/00; G06T 7/004
See application file for complete search history.

(56) References Cited

U.S. PATENT DOCUMENTS

| 8,144,990 B2* | 3/2012 | Englund | G06F 17/289 382/181 |
| 9,104,661 B1* | 8/2015 | Evans | G06F 17/28 |
| 2003/0200078 A1* | 10/2003 | Luo | G06F 17/2863 704/2 |
| 2006/0204111 A1 | 9/2006 | Koshi et al. | |
| 2008/0059481 A1* | 3/2008 | Kunimatsu | H04N 7/17309 |

FOREIGN PATENT DOCUMENTS

JP    2006-251902    9/2006

\* cited by examiner

*Primary Examiner* — Phuoc Tran
(74) *Attorney, Agent, or Firm* — Hubbs, Enatsky & Inoue PLLC (57) ABSTRACT

In a combined image obtained by superposing a character image on an image such that a second text rendered in the character image overlaps a first text rendered in the image, an image processing device according to the present invention determines a part of a character portion constituting a pre-translation character string, not covered by non-transparent pixels constituting a post-translation character string as a deficient pixel D, and corrects color attribute of the deficient pixel D in the combined image by utilizing color attribute of a part of the combined image or of the image.

11 Claims, 10 Drawing Sheets

IMAGE PROCESSING DEVICE, IMAGE PROCESSING METHOD, INFORMATION STORAGE MEDIUM, AND PROGRAM

CROSS REFERENCE TO RELATED APPLICATIONS

This application is a National Stage of International Application No. PCT/JP2013/059768 filed on Mar. 29, 2013. The contents of the above documents are incorporated herein by reference in their entirety.

TECHNICAL FIELD

The present invention relates to an image processing device, an image processing method, an information storage medium, and a program, and in particular to image processing for an image integrated with a text.

BACKGROUND ART

In the field of image processing, there maybe a case in which a text is wished to be removed from an image integrated with the text.

In a virtual shopping mall site, for example, an image in which a text, such as "final day" or the like, for use in a bargain sale or the like, is superposed on a background image including an element such as a figure or the like for calling for attention maybe used. In generation of a new image by reading a text from such an image, then translating into a different language, and superposing the translated text on the background image, it is convenient that the text before translation integrated with the image can be removed.

Patent Literature 1 discloses a technique for recognizing a character in a bitmap image obtained by scanning a document where characters are printed in black on a sheet in a single color, then refilling the pixels rendering the character by pixels having the same attribute as that of the sheet, then translating the recognized character to obtain a new different character, and writing the obtained character on the pixels refilled.

CITATION LIST

Patent Literature

Patent Literature 1: Japanese Patent Laid-open Publication No. 2006-251902

SUMMARY

Technical Problem

According to the technique disclosed in Patent Literature 1, all of the pixels rendering the character before translation are refilled by pixels having the same attribute as that of the sheet although writing of the translated character is conducted at a later step, which is inefficient. Moreover, in the case where the background includes two or more colors, an arrangement in which all pixels rendering a character before translation are refilled and a translated character is then written results in a situation in which more complicated refilling processing results in a more load and more deteriorated efficiency.

An object which the present invention aims to achieve is to improve efficiency in processing for removing a text from an image integrated with the text in a series of processing for replacing a text integrated with an image by another text.

Solution to Problem

In order to achieve the above described object, an image processing device according to the present invention includes a target specification unit for specifying, in a combined image where a cover image is superposed on an original image such that a second text rendered in the cover image overlaps a first text rendered in the original image, a correction target part that is within a part constituting the first text and is not covered by a part constituting the second text, and an output unit for outputting data designating the correction target part specified to a correction unit for correcting color attribute of a correction target part in an image, so as to be correlated to the combined image.

An image processing method according to the present invention includes a step of specifying, in a combined image where a cover image is superposed on an original image such that a second text rendered in the cover image overlaps a first text rendered in the original image, a correction target part within apart constituting the first text, not covered by a part constituting the second text, and a step of outputting data designating the correction target part specified to correction unit for correcting color attribute of a correction target part in an image, so as to be correlated to the combined image.

A program according to the present invention causes a computer to function as a target specification unit for specifying, in a combined image where a cover image is superposed on an original image such that a second text rendered in the cover image overlaps a first text rendered in the original image, a correction target part within a part constituting the first text, not covered by a part constituting the second text, and an output unit for outputting data designating the correction target part specified to correction unit for correcting color attribute of a correction target part in an image, so as to be correlated to the combined image.

An information storage medium according to the present invention is a computer readable information storage medium storing a program for causing a computer to function as a target specification unit for specifying, in a combined image where a cover image is superposed on an original image such that a second text rendered in the cover image overlaps a first text rendered in the original image, a correction target part within apart constituting the first text, not covered by a part constituting the second text, and an output unit for outputting data designating the correction target part specified to correction unit for correcting color attribute of a correction target part in an image, so as to be correlated to the combined image.

In an embodiment of the present invention, the image processing device may further include an addition unit for superposing the cover image on the original image to thereby generate the combined image, in which color attribute of at least a part of the part constituting the second text is same or substantially same as color attribute of at least a part of the part constituting the first text, the target specification unit may specify the correction target part in the combined image generated, and the correction unit may determine color attribute of the correction target part by utilizing color attribute of a part in an approximate area, corresponding to the correction target part, the approximate area being similar, in a color attribute pattern of an adjacent part, to a target area including the correction target part and an adjacent part thereof.

In an embodiment of the present invention, the correction unit may specify the approximate area in the combined image or the original image.

In an embodiment of the present invention, the image processing device may further include a range specification unit for specifying a search range in the combined image, the search range including at least one of the part constituting the first text and the part constituting the second text, and being smaller than an entirety of the combined image, and the correction unit may specify the approximate area in the search range specified.

In an embodiment of the present invention, the range specification unit may specify, as the search range, an inside of a bounding rectangle including both of the part constituting the first text and the part constituting the second text.

In an embodiment of the present invention, the image processing device may further include a range specification unit for specifying a search range in the original image, the search range including the part constituting the first text and being smaller than an entirety of the original image, and the correction unit may specify the approximate area in the search range specified.

In an embodiment of the present invention, the combining unit may determine a position at which the cover image is superposed on the original image so as to satisfy a predetermined condition as to a percentage by which the part constituting the first text is covered the part constituting the second text.

In an embodiment of the present invention, the image processing device may further include a calculation unit for calculating a coverage rate indicating a percentage by which the part constituting the first text is covered by the part constituting the second text, and the combining unit may determine that the predetermined condition is satisfied when the coverage rate calculated is equal to or exceeds a predetermined threshold.

In an embodiment of the present invention, the image processing device may further include a cancelling unit for cancelling color attribute of the correction target part specified, and the output unit may output the combined image with color attribute of the correction target thereof cancelled to the correction unit for regarding a part with the color attribute missed in the correction target image as the correction target part.

In an embodiment of the present invention, the image processing device may further include the correction unit.

Advantageous Effects of Invention

According to the present invention, as a part not necessary to be corrected is excluded from a correction target, it is possible to improve efficiency of correction processing for removing a text integrated with an image from the image.

DESCRIPTION OF EMBODIMENTS

In the following, an example of an embodiment of the present invention will be described in detail based on the accompanying drawings.

Figure 1:
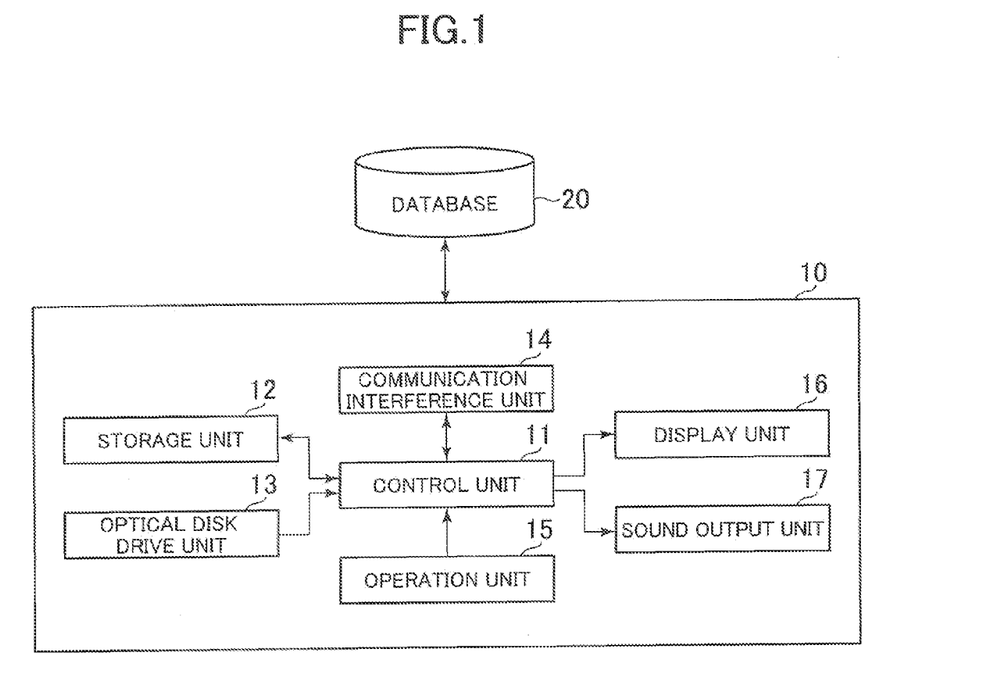
FIG. 1 shows one example of a hardware structure of an image processing device according to an embodiment of the present invention.

FIG. 1 shows an example of a hardware structure of an image processing device 10 according to an embodiment of the present invention. The image processing device 10 is implemented using, for example, a server computer, a desk top computer, a lap top computer, or a tablet computer.

As shown in FIG. 1, the image processing device 10 includes a control unit 11, a storage unit 12, an optical disk drive unit 13, a communication interference unit 14, an operation unit 15, a display unit 16, and a sound output unit 17.

The control unit 11 includes, for example, one or more microprocessors, and executes information processing according to an operating system or a program stored in the storage unit 12. The storage unit 12 includes, for example, a RAM, a hard disk, or a solid state drive. The optical disk drive unit 13 reads a program and data stored in an optical disk (an information storage medium).

A program and data is supplied to the storage unit 12 via an optical disk. That is, a program and data are read from an optical disk by the optical disk drive unit 13, and stored in the storage unit 12. Note that a structural component for reading a program or data stored in an information storage medium (for example, a memory card) other than an optical disk may be included in the image processing device 10, so that a program and data may be supplied to the storage unit 12 via an information storage medium other than an optical disk.

The communication interference unit 14 is an interface for connecting the image processing device 10 to a communication network. The image processing device 10 allows data exchange with other devices via a communication network. Note that a program and data may be supplied to the storage unit 12 via a communication network.

The operation unit 15 is used by a user for operation. For example, a keyboard, a mouse, a touch pad, a touch panel, or a stick (lever) or the like corresponds to the operation unit 15. The display unit 16 is, for example, a liquid crystal display, an organic EL display, or the like. The sound output unit 17 is, for example, a speaker, a headphone terminal, or the like.

The image processing device 10 can access a database 20. The database 20 may be implemented in a device (for example, a server) other than the image processing device 10 or in the image processing device 10.

An image is stored in the database 20. For example, an image for use in a virtual shopping mall site provided by a Web server (not shown) is stored in the database 20. That is, an image prepared by a person in charge from a shop open in the virtual shopping mall is stored in the database 20.

Figure 2:
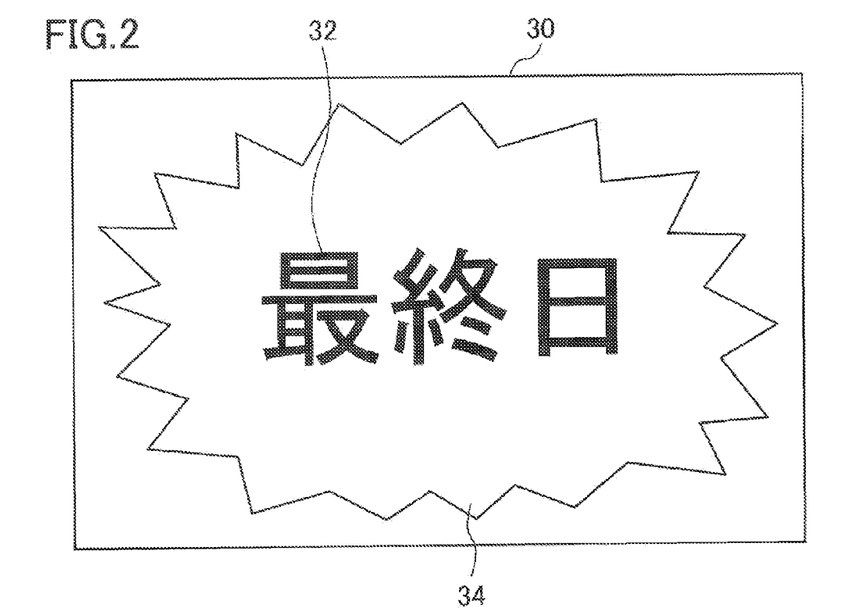
FIG. 2 shows one example of an image.

FIG. 2 shows one example of an image 30 stored in the database 20. The image 30 shown in FIG. 2 is an image showing a character string 32 on a background image 34, that is, an image including the character string 32 integrated with the background image 34. The character string 32 expresses a Japanese character string, namely, "最終II", for use in a bargain sale, for example. Meanwhile, the background image 34 includes a figure, for example, for calling for attention, and includes two or more kinds of colors. The background image 34 may include an element, such as an image based on a real picture, that is more complicated than a geometrical figure.

In this image 30, generally, the character string 32 is often rendered in an outstanding color different from that of the background image 34. Further, the character string 32 is often rendered in a single color, and aligned horizontally, vertically, or diagonally.

Figure 3:
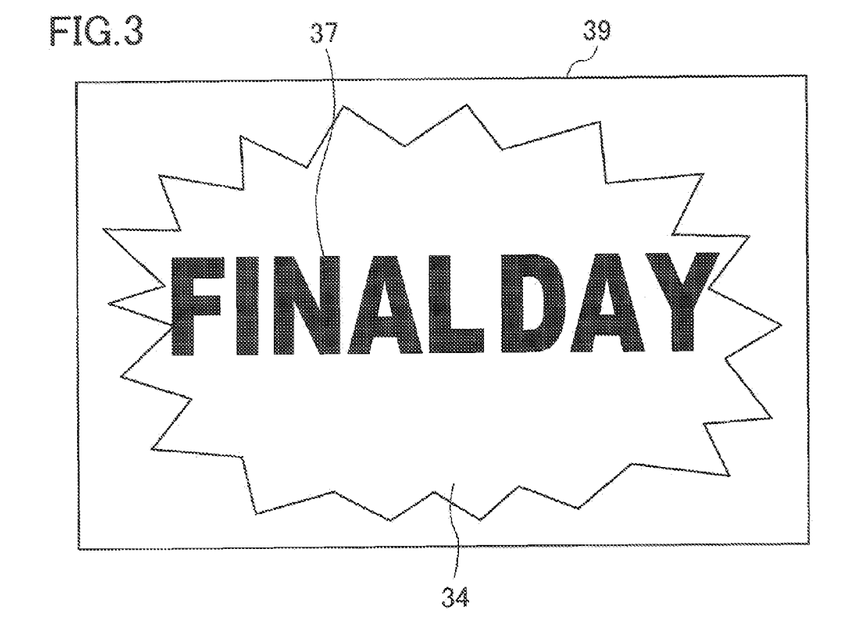
FIG. 3 shows one example of an image after image processing.

FIG. 3 shows one example of an image 39 after image processing by the image processing device 10. The image 39 shown in FIG. 3 is an image showing a character string 37 converted from the character string 32 of the image 30, placed on the background image 34 same as that of the image 30, that is, an image including the character string 37 integrated with the background image 34. The character string 37 expresses an English character string, namely, "FINAL DAY", translated from a Japanese character string "最終日", for example.

In the following, a technique for reading a character string 32 before conversion (a pre-conversion character string 32) from the image 30 shown in FIG. 2, then translating into a different language, and generating an image 39 including a character string 37 after conversion (a post-conversion character string 37) and the background image 34 will be described.

Figure 4:
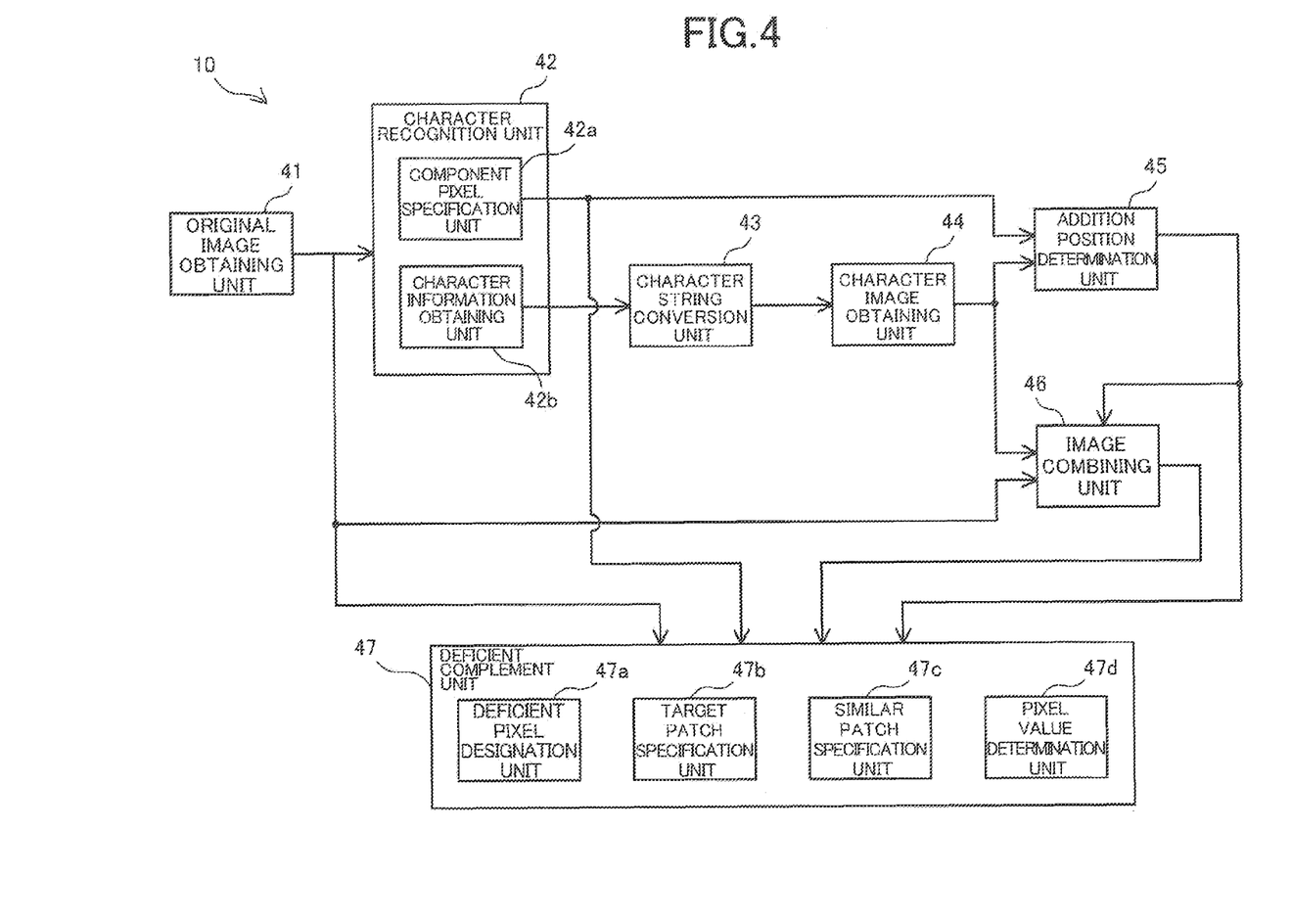
FIG. 4 is a functional block diagram showing one example of functions implemented in an image processing device.

FIG. 4 is a functional block diagram showing functions relevant to the present invention among those implemented in the image processing device 10. As shown in FIG. 4, the image processing device 10 includes an original image obtaining unit 41, a character recognition unit 42, a character string conversion unit 43, a character image obtaining unit 44, an addition position determination unit 45, an image combining unit 46 (an image addition unit 46), and a deficient complement unit 47. The character recognition unit 42 includes a component pixel specification unit 42a, and a character information obtaining unit 42b. The deficient complement unit 47 includes a deficient pixel designation unit 47a, a target patch specification unit 47b, a similar patch specification unit 47c, and a pixel value determination unit 47d. The function blocks shown in FIG. 4 are implemented by the control unit 11 of the image processing device 10.

The original image obtaining unit 41 obtains the image 30 from the database 20, and outputs to the character recognition unit 42, the image combining unit 46, and the deficient complement unit 47.

Figure 6:
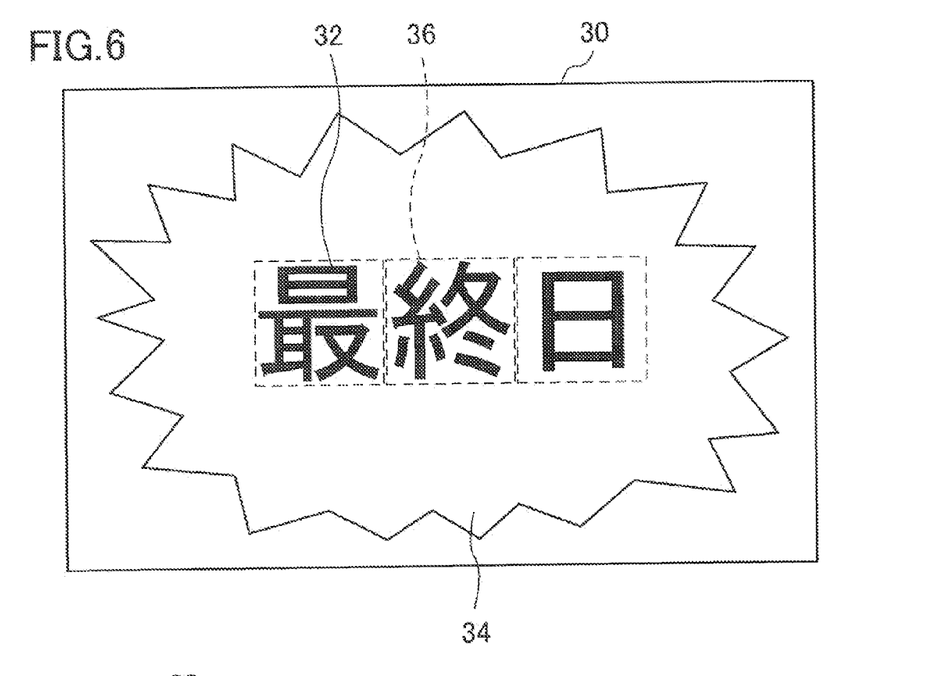
FIG. 6 shows one example of a character area specified through character recognition processing.

The character recognition unit 42 recognizes a pre-conversion character string 32 included in the image 30. The pre-conversion character string 32 included in the image 30 is one example of a first text. As character recognition processing executed by the character recognition unit 42, publicly know character recognition processing referred to as an OCR (Optical Character Recognition), for example, is executed. Specifically, the character recognition unit 42 specifies a character area 36 corresponding to each character of the character string 32, as shown in FIG. 6, and compares a pattern in the character area 36 with a pre-registered pattern to recognize the character of the character string 32.

The component pixel specification unit 42a included in the character recognition unit 42 specifies a component pixel that constitutes the pre-conversion character string 32 included in the image 30, and outputs a component pixel map showing the positions of the component pixels to the addition position determination unit 45 and the deficient complement unit 47. A component pixel that constitutes the pre-conversion character string 32 is specified by binarizing the inside of the character area 36 shown in FIG. 6, for example. A pattern of the component pixels is used in character recognition processing.

The character information obtaining unit 42b included in the character recognition unit 42 obtains character information indicating the pre-conversion character string 32 through character recognition processing, and outputs to the character string conversion unit 43. The character information includes, for example, a character code of each character included in the character string 32.

Although character information indicating the pre-conversion character string 32 is obtained through character recognition processing in this embodiment, this is not limiting. For example, character information indicating the pre-conversion character string 32 may be readably embedded in the image 30 and then obtained.

Having received the character information indicating the pre-conversion character string 32, the character string conversion unit 43 converts the pre-conversion character string 32, and outputs character information indicating the post-conversion character string 37 to the character image obtaining unit 44. The post-conversion character string 37 converted by the character string conversion unit 43 is one example of a second text. In this embodiment, the character string 32 is translated into a different language. For example, a Japanese character string 32, namely, "最終日" is translated into an English character string 37, namely, "FINAL DAY".

The above described, however, is not limiting, and the character string 32 may be converted into a different type of character in the same language. For example, the character string 32 in Chinese character, namely, "最終日", may be converted into a character string in hiragana, namely, "さいしゅうび", or that in katakana, namely, "サイシュウビ". The number of characters included in a character string is not limited to two or more, but may be one.

In the case where the character string 32 expresses such content as a date, a price, or the like, the character string 32 may be updated to a character string expressing the latest state of the content. For example, when the control unit 11 recognizes that the character string 32 expresses a date or a price, the control unit 11 obtains information on the current date or price, and updates the character string 32 to a character string expressing the current date or price.

Having received the character information on the post-conversion character string 37, the character image obtaining unit 44 obtains a character image expressing the post-conversion character string 37 from a font database (not shown), and outputs to the addition position determination unit 45 and the image combining unit 46. In the case of an outline font, a character image expressing the post-conversion character string 37 is rasterized before being outputted.

In the case of a bit map front, a character image expressing the post-conversion character string 37 is outputted intact.

The addition position determination unit 45 is one example of a calculation means, and determines an addition position at which a character image expressing the post-conversion character string 37 is added such that a percentage by which non-transparent pixels in a character image as a part constituting the post-conversion character string 37 cover the component pixels as a part constituting the pre-conversion character string 32 included in the image 30 satisfies a predetermined condition.

The image combining unit 46 is one example of an addition means, and adds a character image expressing the post-conversion character string 37 on the pre-conversion character string 32 of the image 30. Specifically, the character image expressing the post-conversion character string 37 is added at the position in the image 30 determined by the addition position determination unit 45.

The deficient complement unit 47 regards a part of the part constituting the pre-conversion character string 32 of the image 30, not covered by the part constituting the post-conversion character string 37 as a correction target part, and corrects the color attribute of the correction target part. Specifically, the deficient complement unit 47 regards a pixel among the component pixels constituting the pre-conversion character string 32 in the image 30, not covered by a character image expressing the post-conversion character string 37 as a deficient pixel, and complements the pixel value of the deficient pixel, based on the pixel values of other pixels. A deficient pixel is one example of the correction target part, and a pixel value is one example of color attribute. A method for complementing a deficient pixel will be described later in detail.

The deficient pixel designation unit 47a included in the deficient complement unit 47 is one example of a target specification means, an output means, and a cancellation means, and designates a deficient pixel in the image 30 on which the character image expressing the post-conversion character string 37 has been added. Then, the deficient pixel designation unit 47a correlates data designating the deficient pixel with the image 30 after addition, and outputs to the target patch specification unit 47b and the pixel value determination unit 47d. Note that the date designating the deficient pixel includes, for example, coordinate data indicating the position of the deficient pixel in the image 30 after addition.

The target patch specification unit 47b included in the deficient complement unit 47 specifies a target patch in the image 30 on which the character image expressing the post-conversion character string 37 has been added. A target patch is one example of a target area, and includes a deficient pixel as a correction target part and a set of adjacent pixels as an adjacent part thereof.

The similar patch specification unit 47c included in the deficient complement unit 47 is one example of a range specification means, and specifies a similar patch corresponding to the target patch in the image 30 on which the character image expressing the post-conversion character string 37 has been added or the image 30 before addition thereon of the character image expressing the post-conversion character string 37. A similar patch is one example of an approximate area. The similar patch specification unit 47c may narrow down a search range for search for the similar patch in the image 30 before or after addition.

Note that a similar patch is a candidate patch that is similar to the target patch among a plurality of candidate patches specified in the image 30, and that being similar means that the pixel values of pixels in a candidate patch, corresponding to adjacent pixels in the target patch are close to that of the adjacent pixels in the target patch.

The pixel value determination unit 47d included in the deficient complement unit 47 is one example of a correction means, and determines the pixel value of the deficient pixel, based on the pixel value of a pixel included in the similar patch. Specifically, the pixel value of the deficient pixel included in the target patch is determined, based on the pixel value of a pixel corresponding to the deficient pixel in the similar patch.

The function blocks shown in FIG. 4 may be implemented by a plurality of devices. For example, character recognition processing by the character recognition unit 42, image combining processing by the image combining unit 46, and deficient processing by the deficient complement unit 47 may be executed by separate devices. Further, these processings may be executed at discrete times. In this case, data generated in the character recognition processing and the image combining processing may be temporarily held in a database. Moreover, the processing may be partially executed by a client in a client server system in response to an instruction from a server.

Figure 5:
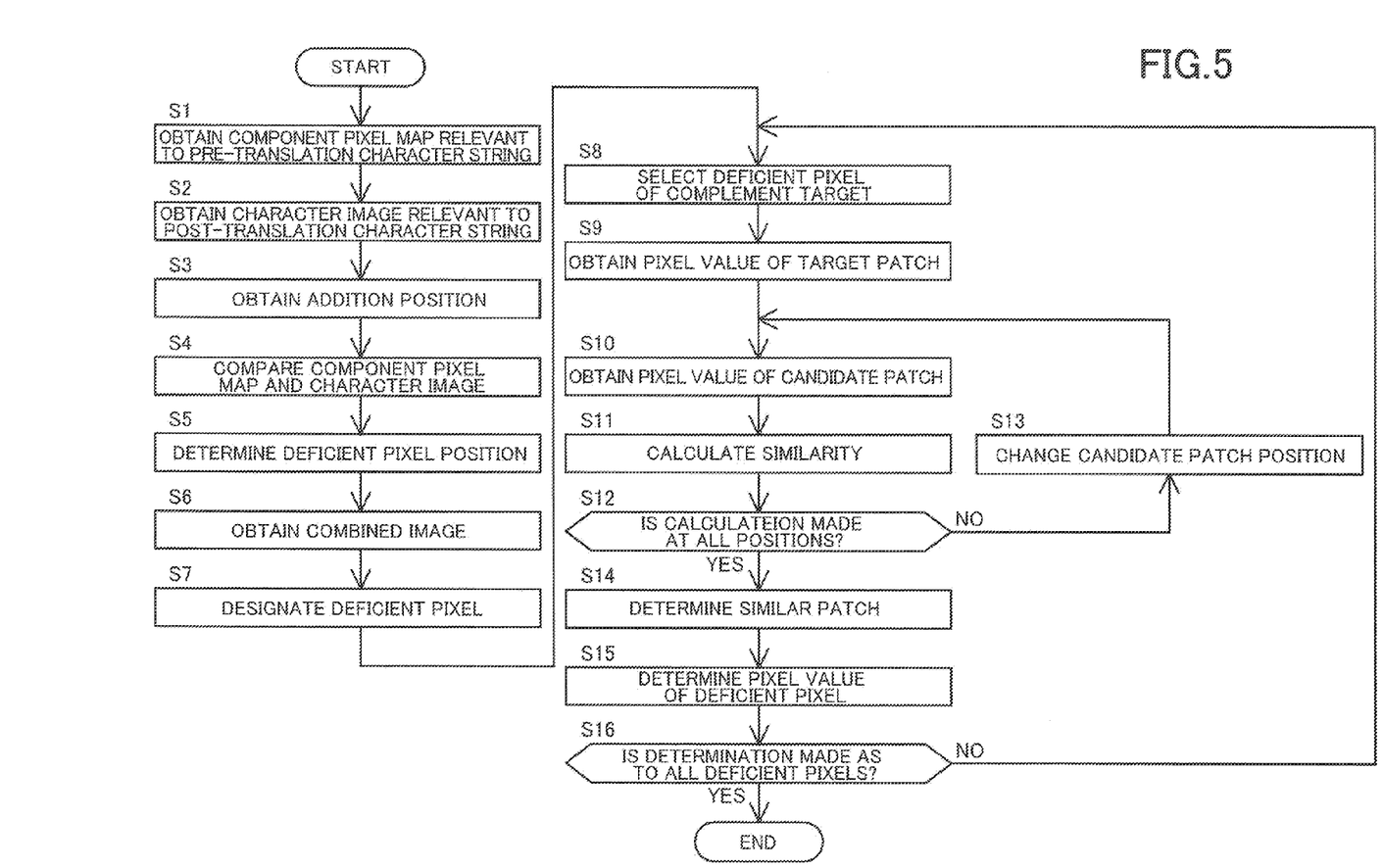
FIG. 5 is a flowchart showing one example of processing executed in an image processing device.

FIG. 5 is a flowchart showing one example of processing executed in the image processing device 10 to implement the deficient complement unit 47, the deficient pixel designation unit 47a, the target patch specification unit 47b, the similar patch specification unit 47c, and the pixel value determination unit 47d. The control unit 11 executes the processing shown in FIG. 5 according to a program to thereby function as the deficient complement unit 47, the deficient pixel designation unit 47a, the target patch specification unit 47b, the similar patch specification unit 47c, and the pixel value determination unit 47d. In the following, referring to FIG. 5, details on the deficient complement unit 47, the deficient pixel designation unit 47a, the target patch specification unit 47b, the similar patch specification unit 47c, and the pixel value determination unit 47d will be described.

At S1 in FIG. 5, the control unit 11 obtains the component pixel map 50 relevant to a character string 32 before translation (a pre-translation character string 32).

Figure 7:
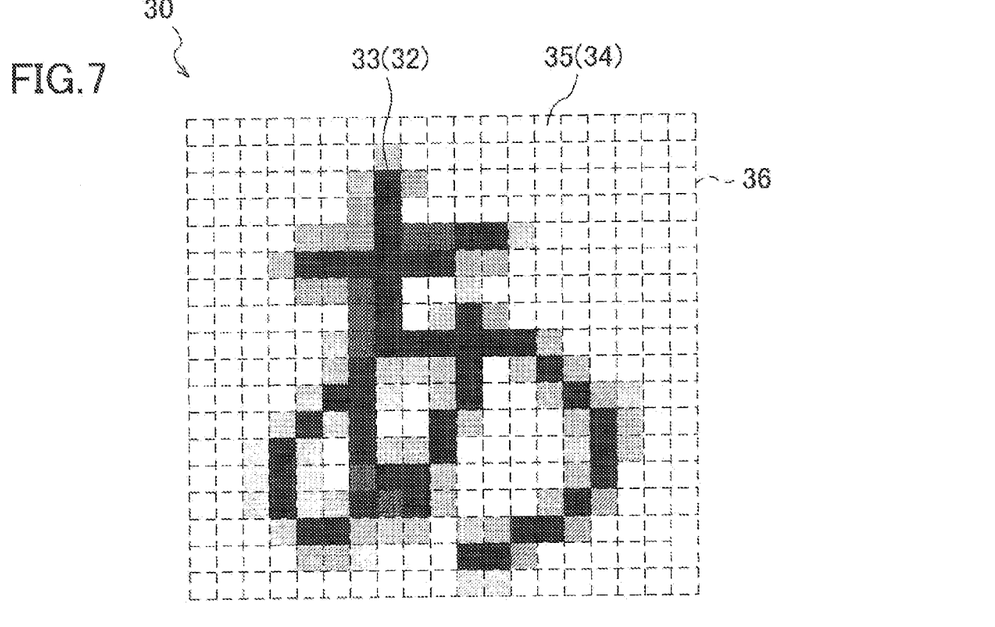
FIG. 7 shows one example of a pre-translation character string included in an image.

Before describing the component pixel map 50 relevant to the pre-translation character string 32, the pre-translation character string 32 included in the image 30 will be described. FIG. 7 shows one example of the pre-translation character string 32 included in the image 30. In the diagram, to facilitate understanding, the character "あ" is shown as a character included in the pre-translation character string 32. Further, the background of the character "あ", which is shown colorless in the diagram to facilitate understanding, actually includes one or more kinds of colors. As shown in the diagram, the image 30 includes a character portion 33 relevant to the pre-translation character string 32 and a background part 35 relevant to the background image 34. When the respective characters of the pre-translation character string 32 are subjected to anti-aliasing, a plurality of kinds of pixels different in brightness exist in the character portion 33 near the boundary to the background part 35. A pixel in the character portion 33 included in the image 30 is specified as a component pixel that constitutes the pre-translation character string 32. Note that the character portion 33 includes a set of pixels including one or more component pixels that constitute the pre-translation character string 32.

Figure 8:
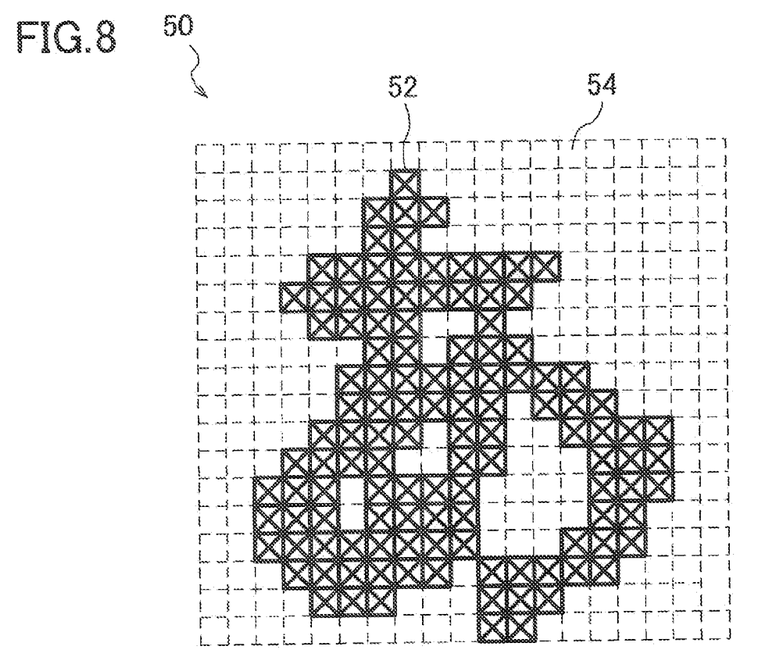
FIG. 8 shows one example of a component pixel map relevant to a pre-translation character string.

FIG. 8 shows one example of the component pixel map 50 relevant to the pre-translation character string 32. The component pixel map 50 includes a component pixel 52 constituting the character of the pre-translation character string 32 and a non-component pixel 54 for a background and not constituting the character. In the diagram, a pixel with the mark X indicates the component pixel 52, while a pixel without the mark X indicates the non-component pixel 54. The component pixel 52 in the component pixel map 50 shown in the diagram corresponds to a pixel in the character portion 33 expressing the character "あ" of the image 30 shown in FIG. 7.

At S2 in FIG. 5, the control unit 11 obtains the character image 60 relevant to a character string 37 after translation (a post-translation character string 37).

Figure 9:
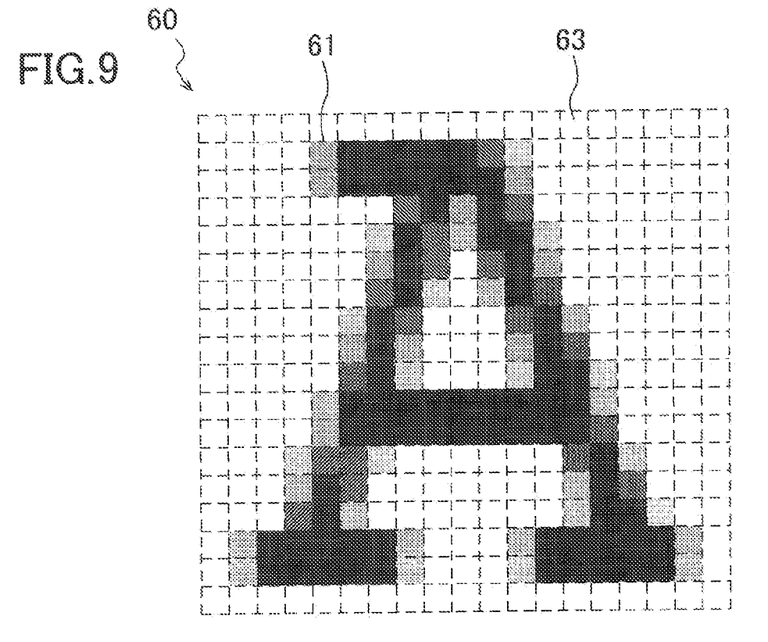
FIG. 9 shows one example of a character image relevant to a post-translation character string.

FIG. 9 shows one example of the character image 60 relevant to the post-translation character string 37. In the diagram, to facilitate understanding, the character "A" is shown as a character included in the post-translation character string 37. The character image 60 includes a non-transparent pixel 61 constituting the character of the post-translation character string 37 and a transparent pixel 63 not constituting the character. When the respective characters of the post-translation character string 37 are subjected to anti-aliasing, the non-transparent pixel 61 includes a plurality of kinds of pixels mutually different in brightness.

As shown in FIG. 7 and FIG. 9, each pixel of the part constituting the post-translation character string 37 of the character image 60 (a set of non-transparent pixels 61) has color attribute same or substantially same as that of each pixel of the character portion 33 relevant to the pre-translation character string 32 of the image 30.

Note that the size of the character image 60 relevant to the post-translation character string 37 is determined in accordance with the size of the character area 36 specified in the image 30 (see FIGS. 6 and 7) or the size of the area of a plurality of character areas 36 in series put together.

The character image 60 relevant to the post-translation character string is one example of a cover image. A cover image may be an image obtained by adding the character image 60 to a transparent image having the same size as that of the original image 30.

At S3 in FIG. 5, the control unit 11 obtains an addition position in the image 30 at which the character image 60 relevant to the post-translation character string 37 is added.

Specifically, an addition position is determined by the addition position determination unit 45, shown in FIG. 4, based on the component pixel map 50 relevant to the pre-translation character string 32 and the character image 60 relevant to the post-translation character string 37. Specifically, the addition position determination unit 45 determines an addition position such that a coverage rate by which the non-transparent pixels 61 in the character image 60 cover the component pixels 52 in the component pixel map 50 becomes equal to or exceeds a predetermined threshold. The coverage rate is expressed as a percentage of the number of component pixels 52 covered by the non-transparent pixels 61 in the character image 60 relative to the number of all component pixels 52 in the component pixel map 50. For example, while moving the character image 60 on the component pixel map 50 for every one or more pixels, the addition position determination unit 45 calculates a coverage rate for every movement to determine a position with the highest coverage rate as an addition position.

At S4 in FIG. 5, the control unit 11 compares the component pixel map 50 relevant to the pre-translation character string 32 and the character image 60 relevant to the post-translation character string 37. In comparison with the component pixel map 50, the addition position obtained at S3 is used as the position of the character image 60.

Figure 10:
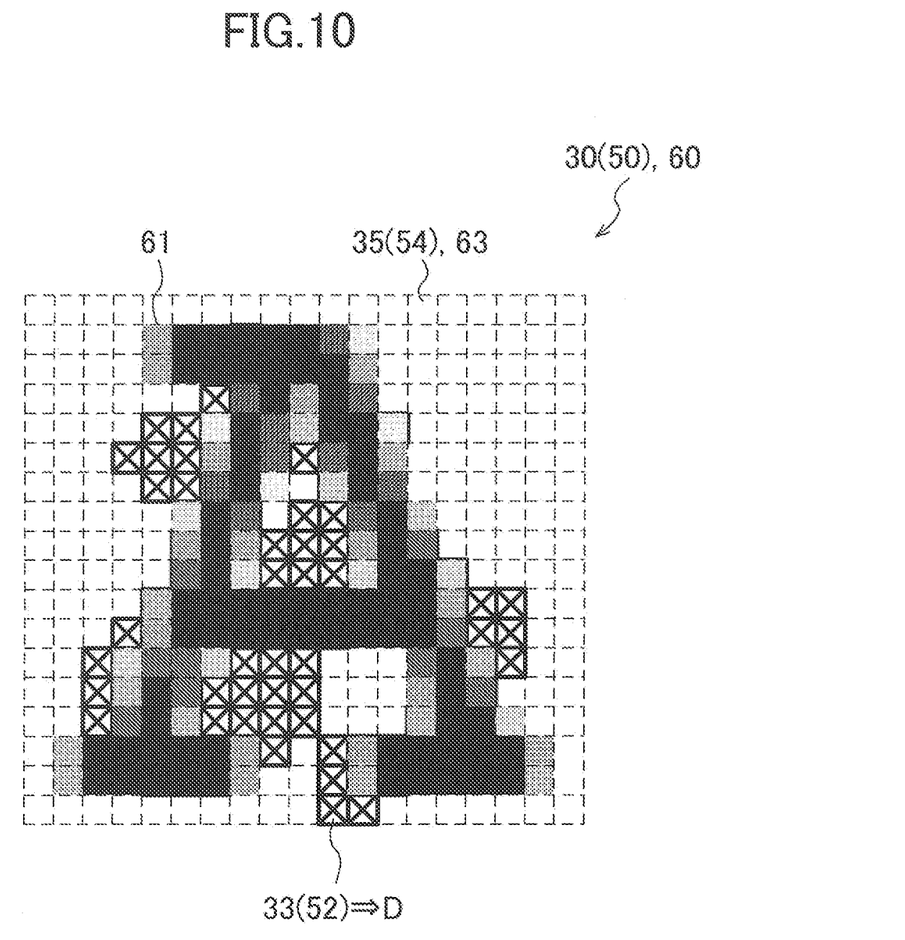
FIG. 10 shows one example of combining an image and a character string (or comparison between a component pixel map and a character image)

FIG. 10 shows one example of comparison between the component pixel map 50 and the character image 60 (FIG. 10 also shows one example of combination to be described later of the image 30 and the character image 60). Through the comparison, the position of a component pixel 52 not covered by the non-transparent pixel 61 in the character image 60 among the component pixels 52 included in the component pixel map 50 is specified (that is, the position of a part of the character portion 33 not covered by the non-transparent pixels 61 in the character image 60 when the character image 60 is added to the image 30).

At S5 in FIG. 5, the control unit 11 determines the position of the component pixel 52 not covered by the non-transparent pixel 61 in the character image 60, specified in the comparison at S4, as the position of a deficient pixel D.

At S6 in FIG. 5, the control unit 11 obtains the image 30 on which the character image 60 has been added. As shown in FIG. 10, in the image 30 on which the character image 60 has been added, the character portion 33 of the image 30 is partially left not covered by the non-transparent pixels 61 near the outer edge of the character rendered by the non-transparent pixels 61 in the character image 60.

At S7 in FIG. 5, in the image 30 on which the character image 60 has been added, the control unit 11 regards and designates a pixel of the character portion 33 of the image 30 not covered by the non-transparent pixels 61 as a deficient pixel D. For example, in the above, the pixel value of the pixel designated as a deficient pixel D is cancelled (that is, set to 0). This cancelation of the pixel value of the pixel designated as the deficient pixel D can simplify complement processing to be described later. However, designation of a deficient pixel D is not limited to cancellation of the pixel value, and, for example, coordinate data indicating the position of the deficient pixel D in the image 30 after addition may be generated.

At S8 to S16 to be followed, complement processing is executed to complement the pixel value of the deficient pixel D in the image 30 on which the character image 60 has been added, based on the pixel values of other pixels. In complement processing, a complement method, such as a publicly known impainting or the like, for example, may be applied. However, this is not limiting, and any other complement methods such as linear interpolation or the like may be applicable.

Specifically, at S8 in FIG. 5, the control unit 11 selects one deficient pixel D from among a plurality of deficient pixels D as a complement target. In selection of a deficient pixel D as a complement target, the selection is begun with priority with a deficient pixel D having a larger number of adjacent pixels having pixel values. For example, in the case where a plurality of deficient pixels D are positioned gathered, the selection of a complement target is begun with priority with a deficient pixel D near the periphery.

Figure 11:
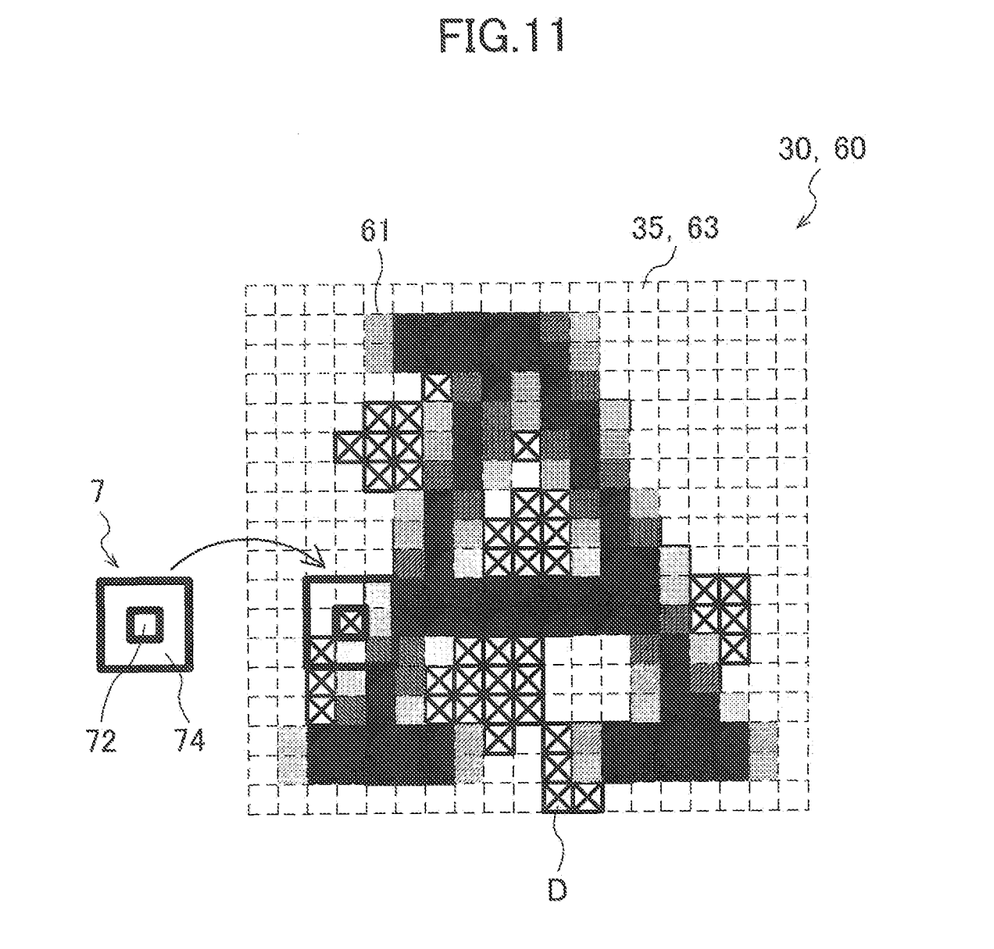
FIG. 11 shows one example of specification of a target patch.

After selection of a deficient pixel D as the complement target, a target patch 7 is specified in the image 30 on which the character image 60 has been added. FIG. 11 shows one example of specification of a target patch 7. A target patch 7 includes a deficient pixel area 72 at the center thereof and an adjacent pixel area 74 around the deficient pixel area 72. The deficient pixel area 72 is an area for the deficient pixel D selected as the complement target, and the adjacent pixel area 74 is an area for adjacent pixels adjacent to the deficient pixel D. In the example shown in FIG. 11, the adjacent pixels include four non-transparent pixels 61, three pixels for the background part 35, and one deficient pixel D. In particular, the non-transparent pixels 61 are concentrated in the right half of the target patch 7, and the pixels for the background part 35 are concentrated in the left half of the target patch 7. In this embodiment, the size of the target patch 7 is equal to that of 3×3 pixels, though the size may be larger.

At S9 in FIG. 5, the control unit 11 obtains the pixel value of a pixel in the target patch 7 specified in the image 30 on which the character image 60 has been added. Specifically, the control unit 11 obtains the pixel value of each pixel in the adjacent pixel area 74 of the target patch 7.

Figure 12:
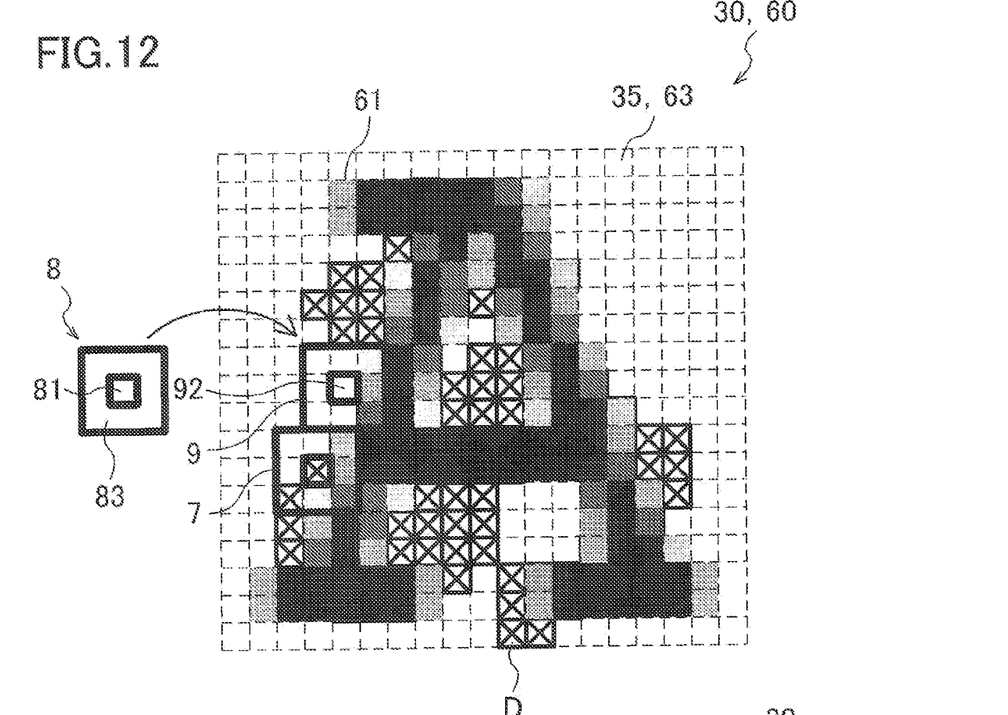
FIG. 12 shows one example of specification of a similar patch.

At S10 in FIG. 5, the control unit 11 specifies a candidate patch 8 in the image 30 on which the character image 60 has been added, and obtains the pixel value of a pixel in the candidate patch 8 such as is shown in FIG. 12. Specifically, the control unit 11 obtains the pixel value of each pixel included in a corresponding adjacent area 83 of the candidate patch 8.

A candidate patch 8 is a patch corresponding to the target patch 7 for determining a similar patch 9 similar to the target patch 7. FIG. 12 shows one example of specification of a similar patch 9. A candidate patch 8 includes a corresponding deficient area 81 at the center thereof and a corresponding adjacent area 83 around the corresponding deficient area 81. The corresponding deficient area 81 is an area corresponding to the deficient pixel area 72 of the target patch 7, and the corresponding adjacent area 83 is an area corresponding to the adjacent pixel area 74 of the target patch 7.

At S11 in FIG. 5, the control unit 11 calculates a similarity in the pixel values between pixels in the target patch 7 and pixels in the candidate patch 8. For example, a similarity is a square sum of the differences in the pixel values between respective pixels included in the adjacent pixel area 74 of the target patch 7 and those included the corresponding adjacent area 83 of the candidate patch 8.

While displacing the candidate patch 8 for every one or more pixels within the image 30 on which the character image 60 has been added, the processing at S10 and S11 is repeated for every displacement (S12 and S13). With the above, similarities at the respective positions in the candidate patch 8 are calculated.

At S14 in FIG. 5, the control unit 11 determines a similar patch, based on the similarities at the respective positions in the candidate patch 8. Specifically, a candidate patch 8 having the highest similarity is determined as the similar patch 9. In the example shown in FIG. 12, similar to the target patch 7 shown in FIG. 11, non-transparent pixels 61 are concentrated in the right half of the similar patch 9, and the pixels for the background part 35 are concentrated in the left half of the similar patch 9.

At S15 in FIG. 5, the control unit 11 determines the pixel value of the deficient pixel D, based on the pixel value of a pixel in the similar patch 9. Specifically, the pixel value of the deficient pixel D in the deficient pixel area 72 of the target patch 7 is determined, based on the pixel value of the pixel in the corresponding deficient area 92 of the similar patch 9. For example, a value same as the pixel value of the pixel in the corresponding deficient area 92 is applied as the pixel value of the deficient pixel D in the deficient pixel area 72. The pixel value of the deficient pixel D that is the complement target is complemented as described above.

While sequentially selecting the deficient pixel D as the complement target, the above described processing at S8 to S15 is repeated for every selection (S16). When the pixel values of all deficient pixels D are determined, a series of processing is completed (S16: YES). For example, in the case where a plurality of deficient pixels D are positioned gathered, pixel value complement is sequentially executed, beginning with a deficient pixel D near the periphery. In other words, the periphery of the deficient pixels D positioned gathered gradually shifts toward the inside so that the size of the gather becomes gradually smaller to be finally zero.

As described above, in this embodiment, in the image 30 on which the character image 60 has been added, a pixel in the character portion 33 of the image 30 not covered by the non-transparent pixels 61 is regarded as a deficient pixel D, and the pixel value of the deficient pixel D is complemented. As this manner can reduce the number of deficient pixels D, compared to a case in which the pixel values of all pixels in the character portion 33 of the image 30 are complemented, it is possible to reduce a processing load and to improve efficiency. Further, according to this embodiment, as it is possible to disperse a set of deficient pixels D positioned and to reduce the size of the set, it is possible to improve accuracy in complement.

According to this embodiment, as it is likely that a deficient pixel D is resulted near the outer edge of the character rendered by the non-transparent pixels 61 in the character image 60, it is likely that the outer edge of the character rendered by the non-transparent pixels 61 is included in the target patch 7 (that is, it is likely that the non-transparent pixel 61 and the pixel for the background part 35 coexist in the target patch 7). Accordingly, the similar patch 9 as well is determined near the outer edge of the character rendered by the non-transparent pixels 61. This can improve accuracy in complement applied near the outer edge of the character. That is, superposition of the character image 60 relevant to the post-translation character string 37 on the image 30 relevant to the pre-translation character string 32 creates a situation in which the similar patch 9 is likely resulted. This can reduce a processing load in complement processing and improve efficiency.

This embodiment is particularly effective in the case where the character rendered by the non-transparent pixels 61 in the character image 60 is subjected to anti-aliasing and the case where the background part 35 of the image 30 includes a fine pattern in two or more colors.

Figure 13:
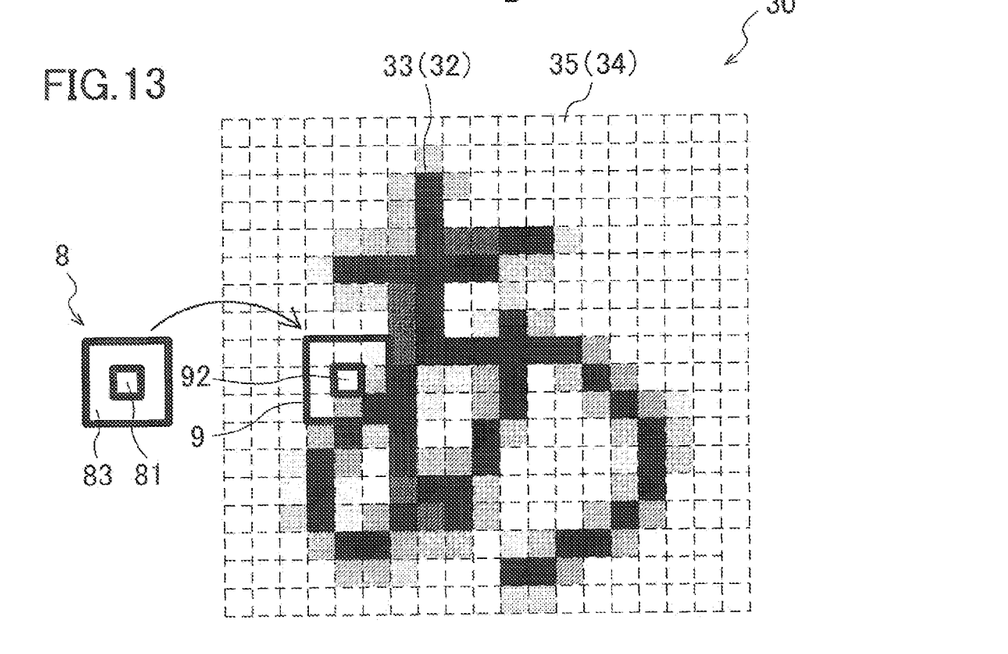
FIG. 13 shows another example of specification of a similar patch.

Note that specification of the similar patch 9 at S10 to S14 may be conducted within the image 30 on which the character image 60 has not been added. That is, as shown in FIG. 13, the control unit 11 may specify the candidate patch 8 in the image 30 including the pre-translation character string 32, then calculate a similarity, and determine the similar patch 9 in the image 30 including the pre-translation character string 32. With the above, the pixel value of the deficient pixel D in the target pitch 7 specified in the image 30 on which the character image 60 has been added (see FIG. 11) is determined, based on the pixel value of the pixel in the similar patch 9 determined in the image 30 including the pre-translation character string 32.

When a similar patch 9 is determined in the image 30 including the pre-translation character string 32 but not the character image 60 added thereon, as described above, an additional effect can be expected, in addition the above described effect, that the condition of pixels in the original image 30 before addition of the character image 60 thereon, in particular, the condition of pixels near the outer edge of the character portion 33, can be more readily reproduced.

Figure 14:
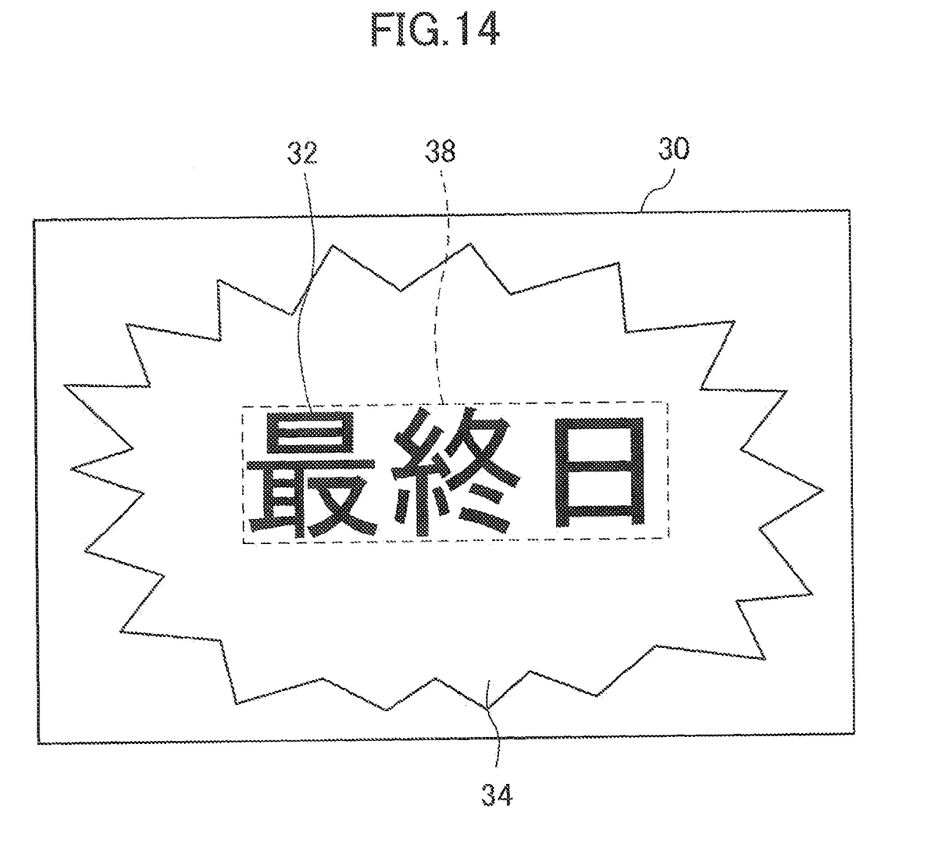
FIG. 14 shows one example of an area for searching for a similar patch.

Further, specification of the similar patch 9 at S10 to S13 may be conducted within a partial area (the search area 38) corresponding to the pre-translation character string 32 of the image 30. For example, as shown in FIG. 14, the search area 38 is set so as to include the pre-translation character string 32 in the image 30 before addition.

Meanwhile, in the case where the similar patch 9 is specified in the image 30 after addition, the search area 38 is set such that at least one of the pre-translation character string 32 and the post-translation character string 37 is included in the image 30 after addition. In the above, it is preferable that the inside of a bounding rectangle including both of the pre-translation character string 32 and the post-translation character string 37 is determined as the search area 38.

When movement of the candidate patch 8 for calculation of a similarity is limited to within the search area 38, it is possible to reduce a processing load in calculation processing for determining the similar patch 9. As the similar patch 9 is likely determined near the outer edge of the character rendered by the non-transparent pixels 61 (for the image 30, near the outer edge of the character portion 33), as described above, the above described limitation on the search area 38 has little influence in accuracy in complement. That is, when the search area 38 is set as described above, the search area 38 is set limited to an area where the similar patch 9 is highly likely resulted. This can reduce a processing load in complement processing, and to further improve efficiency.

Although embodiments of the present invention have been described in the above, the present invention is not limited to the above described embodiments, and a variety of modifications are possible for a person skilled in the above.

Although the pixel value of the pixel designated as the deficient pixel D is once cancelled to zero, and the pixel value of the deficient pixel D is then complemented to a new value in the above described embodiment, this is not limiting. For example, the pixel value of the pixel designated as the deficient pixel D may be not be cancelled, but corrected by increasing or decreasing the pixel value.

The invention claimed is:

1. An image processing device, comprising:
a target specification unit for specifying, in a combined image where a cover image is superposed on an original image such that a second text rendered in the cover image overlaps a first text rendered in the original image, a correction target part that is within a part constituting the first text and is not covered by a part constituting the second text, and
an output unit for outputting data designating the correction target part specified to a correction unit for correcting a color attribute of a correction target part in an image, being correlated with the combined image.

2. The image processing device according to claim 1, wherein the correction unit:
calculates, for each of a plurality of candidate patches, a similarity in the color attribute between an adjacent part of the correction target part in a target part and a part corresponding to the adjacent part in one of the plurality of candidate patches,
then specifies one similar patch among the plurality of candidate patches, based on the respective similarities calculated, and
determines the color attribute of the correction target part by utilizing a color attribute of a part corresponding to the correction target part in the specified similar patch.

3. The image processing device according to claim 2, wherein the correction unit specifies the plurality of candidate patches in the combined image or the original image.

4. The image processing device according to claim 2, further comprising a range specification unit for specifying a search range in the combined image, the search range including at least one of the part constituting the first text and the part constituting the second text, and the search range being smaller than an entirety of the combined image,
wherein
the correction unit specifies the plurality of candidate patches in the search range specified.

5. The image processing device according to claim 4, wherein the range specification unit specifies, as the search range, an inside of a bounding rectangle including both of the part constituting the first text and the part constituting the second text.

6. The image processing device according to claim 2, further comprising range specification unit for specifying a search range in the original image, the search range including the part constituting the first text and being smaller than an entirety of the original image,
wherein
the correction unit specifies the plurality of candidate patches in the search range specified.

7. The image processing device according to claim 2, further comprising a combining unit for generating the combined image by superposing the cover image on the original image, wherein the combining unit determines a position at which the cover image is superposed on the original image so as to satisfy a predetermined condition as to a percentage by which the part constituting the first text is covering the part constituting the second text.

8. The image processing device according to claim 7, further comprising a calculation unit for calculating a coverage rate indicating a percentage by which the part constituting the first text is covered by the part constituting the second text,
wherein
the combining unit determines that the predetermined condition is satisfied when the coverage rate calculated is equal to or exceeds a predetermined threshold.

9. The image processing device according to claim 1, further comprising a cancelling unit for cancelling the color attribute of the correction target part specified,
wherein
the output unit outputs the combined image, with the color attribute of the correction target thereof cancelled, to the correction unit for correcting the color attribute of a part with the color attribute missed in the correction target image as the correction target part.

10. An image processing method, comprising:
specifying, with a target specification unit, in a combined image where a cover image is superposed on an original image such that a second text rendered in the cover image overlaps a first text rendered in the original image, a correction target part within a part constituting the first text that is not covered by a part constituting the second text, and
outputting, with an output unit, data designating the correction target part specified to a correction unit for correcting a color attribute of a correction target part in an image, so as to be correlated to the combined image.

11. A non-transitory computer readable information storage medium storing a program for causing a computer to function as:
a target specification unit for specifying, in a combined image where a cover image is superposed on an original image such that a second text rendered in the cover image overlaps a first text rendered in the original image, a correction target part within a part constituting the first text and is not covered by a part constituting the second text, and an output unit for outputting data designating the correction target part specified to correction unit for correcting a color attribute of a correction target part in an image, so as to be correlated to the combined image.

\* \* \* \* \*